UNITED STATES PATENT OFFICE.

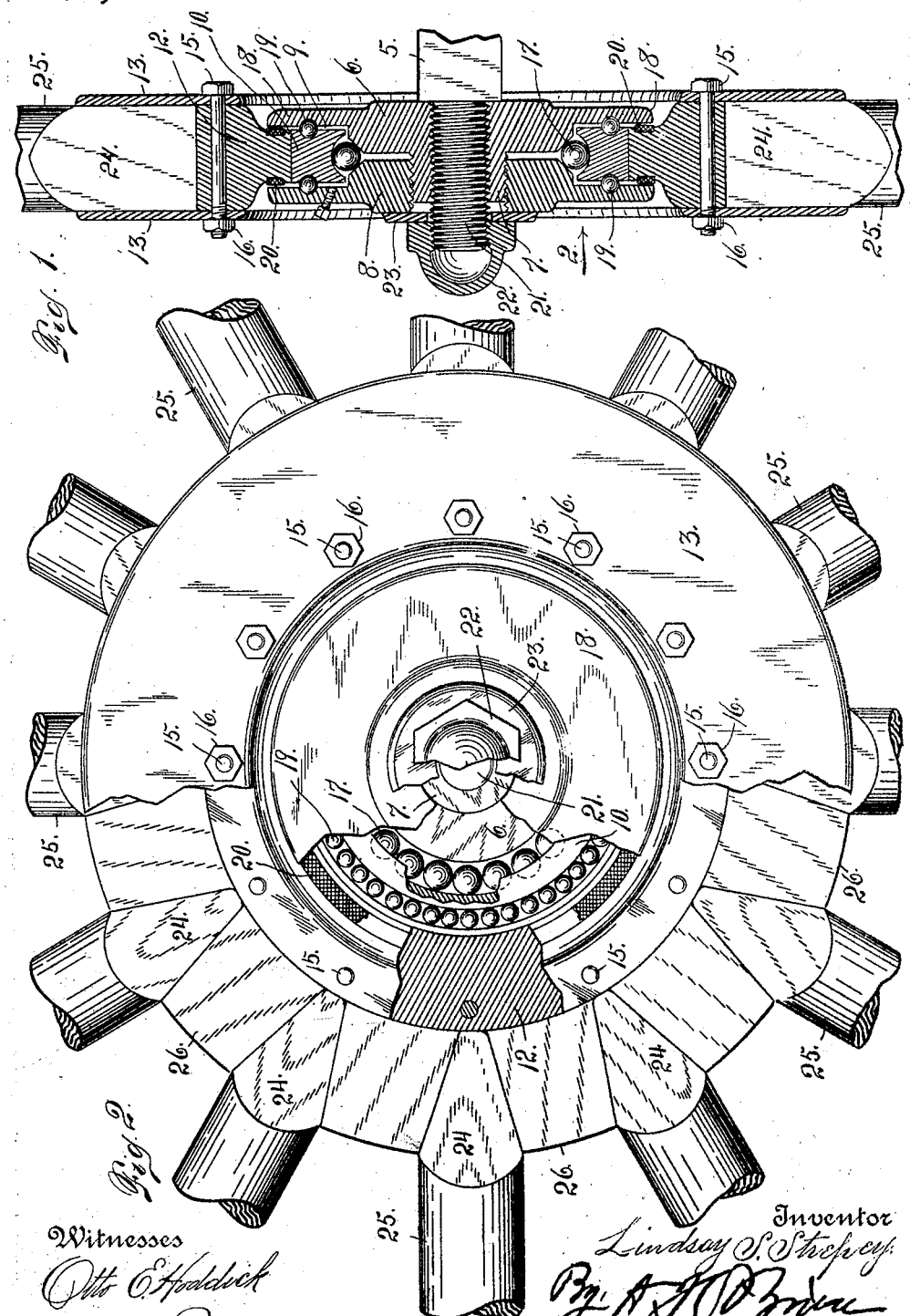

LINDSAY S. STREPEY, OF VICTOR, COLORADO, ASSIGNOR OF TWO-SEVENTHS TO JASPER N. STREPEY, OF BUENA VISTA, COLORADO.

WHEEL-BEARING.

971,417.  Specification of Letters Patent.  Patented Sept. 27, 1910.

Application filed February 5, 1908. Serial No. 414,360.

*To all whom it may concern:*

Be it known that I, LINDSAY S. STREPEY, a citizen of the United States, residing at Victor, in the county of Teller and State of Colorado, have invented certain new and useful Improvements in Wheel-Bearings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in wheel constructions but more especially to the bearings of wheels whether used for vehicles or other purposes.

An important object of my invention, is to reduce the friction ordinarily incident to the rotation of the wheel upon its axle and to this end I apply to the axle extremity a relatively narrow journal of relatively large diameter, the same being grooved to receive what I will term the inner periphery or hub of the wheel in one form of the construction. In this particular form, the hub or inner periphery of the wheel is provided with a steel ring having ball recesses to partly receive three sets of ball bearings interposed between the journal and the wheel hub, one set of bearings being interposed between the circumferential face of the ring and the journal while the other sets of bearings are located on opposite sides of the steel ring and interposed between the latter and the sides of the journal members which inclose the groove.

Having briefly outlined my improved construction, I will proceed to describe the same in detail reference being made to the accompanying drawing in which is illustrated an embodiment thereof.

In this drawing, Figure 1 is a sectional view taken through the bearing of a vehicle wheel in which my invention is embodied. Fig. 2 is a side view of the same partly broken away and partly sectionized. This view is obtained by looking in the direction of arrow 2 Fig. 1.

Referring first to Figs. 1 and 2, let the numeral 5 designate a vehicle axle upon which is threaded a journal member 6 having a threaded extension 7 upon which is screwed an interiorly threaded coöperating member 8. The members 6 and 8 are cut away to form a groove 9 adapted to receive the reduced portion of the inner periphery of a vehicle wheel. This inner periphery consists of a wheel ring 10 brazed upon a member 12 in such a manner that the two parts virtually form an integral construction. To the opposite sides of the hub member 12 which is expanded or reinforced beyond the reduced portion which enters the groove of the journal, are secured circular plates 13 by means of bolts 15 to which are applied nuts 16. Interposed between the circumferential face of the steel ring 10, and the journal are bearing balls 17, the parts engaged by the balls being fashioned to form a suitable ball race therefor, a portion of the race being in each element. Also interposed between the steel ring 10 and portions 18 of the journal on opposite sides of the groove 9, are bearing balls 19 which engage race ways formed partly in the ring and partly in the parts 18. Applied to the member 12 of the vehicle hub on opposite sides, are packing rings 20 composed of felt or other suitable packing material adapted to exclude dust from the ball bearings of the construction. To the outer extremity of the threaded portion 21 of the axle is applied an axle nut 22 which is screwed against a washer 23, the latter being in direct contact with the member 8 of the journal. Interposed between the circular plates 13, are the inner extremities 24 of the spokes 25 of the wheel. These extremities are tapered or wedge-shaped, tapering from the outer edge of the plates 13. Interposed between the spoke extremities 24, are wedge blocks 26 which are widest at their inner extremities and tapered as they extend outwardly The inner extremities of the spokes are maintained in position by virtue of these blocks together with the plates 13. The spokes are retained in position against displacement in a radial direction, by the rim or felly (not shown) of the wheel.

From the foregoing description the use of my improved device as well as the assembling of the various parts of the mechanism will be readily understood. To facilitate the assembling of the parts, the journal is composed of two members 6 and 8 as heretofore described. In assembling the parts the member 6 will be first screwed upon the threaded extremity 21 of the axle. The wheel will then be put in position, after which the journal member 8 will be applied. It must be assumed that the ball bearings are put in position and also that the circular plates 13 are applied at the proper time and connected with the hub of the wheel by the bolts 15. It is evident that in order to place the wedge blocks 26 in position between the inner extremities of the spokes, one of the circular plates 13 must be absent since these wedge blocks must be applied or inserted in a transverse or lateral direction.

Having thus described my invention, what I claim is:

The combination with an axle, of an inner bearing member composed of two members, one member being threaded to the outer extremity of the axle to rotate therewith and having a reduced protruding exteriorly threaded part, the second bearing member being secured upon the protruding part of the first named member, the outer portions of the abutting faces of the bearing members being cut away at right angles to form a circumferential groove in the bearing when the two members are assembled, a rotary element whose inner face enters the groove of the bearing, bearing balls interposed between the rotary element and the bearing members, one set of balls engaging the inner face of the hub and the other sets the opposite sides thereof, and packing rings interposed between the portion of the rotary element which enters the groove of the bearing and the walls of the grooves on opposite sides, substantially as described.

In testimony whereof I affix my signature in presence of two witnesses.

LINDSAY S. STREPEY.

Witnesses:
  DENA NELSON,
  ALODIA HUTCHISON.